United States Patent
Tao et al.

(10) Patent No.: US 11,494,071 B2
(45) Date of Patent: Nov. 8, 2022

(54) METHOD FOR DISPLAYING HANDWRITTEN INPUT CONTENT, ELECTRONIC DEVICE AND COMPUTER STORAGE MEDIUM

(71) Applicant: ZHANGYUE TECHNOLOGY CO., LTD, Beijing (CN)

(72) Inventors: Hongtao Tao, Beijing (CN); Wenzhi Zhu, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/768,411

(22) PCT Filed: Mar. 22, 2018

(86) PCT No.: PCT/CN2018/080055
§ 371 (c)(1),
(2) Date: Jul. 23, 2020

(87) PCT Pub. No.: WO2019/127941
PCT Pub. Date: Jul. 4, 2019

(65) Prior Publication Data
US 2020/0409546 A1 Dec. 31, 2020

(30) Foreign Application Priority Data
Dec. 26, 2017 (CN) .......................... 201711431191.7

(51) Int. Cl.
G06F 3/04883 (2022.01)
G06F 3/14 (2006.01)
(Continued)

(52) U.S. Cl.
CPC ........ *G06F 3/04883* (2013.01); *G06F 3/1407* (2013.01); *G06F 3/1415* (2013.01);
(Continued)

(58) Field of Classification Search
CPC ............... G06F 3/04883; G06F 3/1415; G06F 15/0225; G06F 3/1407; G06F 40/171;
(Continued)

(56) References Cited

U.S. PATENT DOCUMENTS 6,466,210 B1 * 10/2002 Carlsen .................. G06T 11/60
345/629
6,501,464 B1 * 12/2002 Cobbley ............... G06F 3/0481
345/173

(Continued)

FOREIGN PATENT DOCUMENTS

CN 105446647 A 3/2016
CN 105677107 A 6/2016

OTHER PUBLICATIONS

International Patent Application No. PCT/CN2018/080055; Int'l Search Report; dated Sep. 30, 2018; 2 pages.

Primary Examiner — Andrew L Tank
(74) Attorney, Agent, or Firm — BakerHostetler (57) ABSTRACT

Disclosed are a method for displaying handwritten input content, an electronic device and a non-volatile computer readable storage medium. The method includes: acquiring handwritten input content; modifying image stored in a display cache based on the handwritten input content, and synchronizing a modified image to a display screen; and drawing the handwritten input content in a custom graphic layer located above other graphic layers in a system cache, performing a graphic layer merging operation for the other graphic layers and the custom graphic layer, and replacing the modified image stored in the display cache in response to a result of the operation.

19 Claims, 3 Drawing Sheets

(51) Int. Cl.
  *G06F 15/02*      (2006.01)
  *G06V 10/22*      (2022.01)
  *G06F 40/171*     (2020.01)

(52) U.S. Cl.
  CPC ........ *G06F 15/0225* (2013.01); *G06F 40/171* (2020.01); *G06V 10/235* (2022.01)

(58) Field of Classification Search
  CPC ...... G06K 9/2081; G06K 9/00; G06V 10/235; G06V 30/1456
  USPC .................. 715/863; 345/629, 545, 557, 636
  See application file for complete search history.

(56) References Cited

U.S. PATENT DOCUMENTS

| | | | | |
|---|---|---|---|---|
| 2002/0064308 A1* | 5/2002 | Altman | ............... | G06F 3/04883 382/187 |
| 2004/0075652 A1* | 4/2004 | Kang | .................. | G06F 3/04883 345/173 |
| 2004/0217947 A1* | 11/2004 | Fitzmaurice | ............ | G06T 11/60 345/183 |
| 2006/0136813 A1* | 6/2006 | Hong | .................... | G06F 40/169 715/232 |
| 2009/0052778 A1* | 2/2009 | Edgecomb | ............ | G06F 40/169 382/188 |
| 2011/0258527 A1* | 10/2011 | Woolf | ................. | G06F 16/9558 715/230 |
| 2012/0030558 A1* | 2/2012 | Chiu | ..................... | G06F 40/169 715/233 |
| 2012/0229485 A1* | 9/2012 | Rhodes | .................. | G09G 5/246 345/545 |
| 2013/0177209 A1* | 7/2013 | Baik | .................. | G06K 9/00671 382/103 |
| 2013/0201112 A1* | 8/2013 | Large | .................. | G06F 3/04883 345/173 |
| 2013/0318465 A1* | 11/2013 | Cheng | .................. | G06Q 10/101 715/776 |
| 2014/0019905 A1* | 1/2014 | Kim | ....................... | G06F 3/0484 715/780 |
| 2014/0075302 A1* | 3/2014 | Akashi | ............... | G06K 9/00402 715/268 |
| 2014/0363083 A1* | 12/2014 | Xia | ..................... | G06K 9/00436 382/189 |
| 2015/0095798 A1* | 4/2015 | Yang | ..................... | G06F 3/0488 715/751 |
| 2017/0060829 A1* | 3/2017 | Bhatt | .................... | G06F 40/169 |
| 2018/0004406 A1* | 1/2018 | Jung | .................... | G06F 3/04883 |
| 2018/0181221 A1* | 6/2018 | Nakajima | ............. | G06F 40/171 |
| 2018/0350124 A1* | 12/2018 | Thimbleby | ........... | G06F 3/0412 |

* cited by examiner

METHOD FOR DISPLAYING HANDWRITTEN INPUT CONTENT, ELECTRONIC DEVICE AND COMPUTER STORAGE MEDIUM

CROSS REFERENCE TO RELATED APPLICATION

This application is the U.S. National Stage of International Application No. PCT/CN2018/080055, filed Mar. 22, 2018, which claims priority to Chinese Patent Application NO.201711431191.7, titled "METHOD FOR DISPLAYING HANDWRITTEN INPUT CONTENT, ELECTRONIC DEVICE AND COMPUTER STORAGE MEDIUM", filed Dec. 26, 2017, the entire contents of which are incorporated herein by reference.

TECHNICAL FIELD

The disclosure relates to the technical field of computer, and in particular to a method for displaying handwritten input content, an electronic device and a non-volatile computer readable storage medium.

BACKGROUND

Currently, with increasing popularization of touch screen, more and more users is used to editing content by handwritten input. In the conventional technology, the handwritten input content is generally displayed in the following manner.

For facilitating displaying, graphic layers corresponding to all drawing operations are stored in a system area (also referred to as a system cache). A merging operation is performed on respective graphic layers stored in the system cache after all drawing operations end, and a result of the merging operation on the graphic layers is copied to a display cache (also referred to as a frame buffer), so that the display cache synchronizes the copied content to the display screen for displaying. Since a plurality of applications running in parallel may exist in the operating system, in order to simultaneously meet drawing requirements of respective applications, graphic layers corresponding to different applications are stored in the system cache. Accordingly, for displaying the handwritten input content, a graphic layer for drawing the handwritten input content is required to be arranged in the system cache. After the handwritten input ends, the merging operation is performed on the respective graphic layers in the system cache in response to a refreshing operation triggered by a user, and content obtained after the merging operation is copied to the display cache, so that the display cache synchronizes the copied content to the display screen for displaying. In the above way, the handwritten input content is displayed.

However, during a process of implementing the present disclosure, it is found by the inventor that the above solution in the conventional technology has at least the following disadvantages. First, when the system cache performs a merging operation on the respective graphic layers, a lot of time is consumed, and thus the merging operation results in a delay of at least 10 ms. Further, in a case that the number of applications in the system is bigger, and the number of graphic layers is also bigger, the delay due to the merging operation may be more than 20 ms. In addition, when the result obtained after the merging operation is copied to the display cache so that the display cache synchronizes the copied content to the display screen for displaying, the copying operation further results in a delay of at least 20 ms. Therefore, the handwritten input manner in the conventional technology results in a longer delay and a slower display speed, and the handwritten input content cannot be displayed in approximate real time.

SUMMARY

A method for displaying handwritten input content, an electronic device and a non-volatile computer readable storage medium are provided according to the present disclosure to overcome the above problem or at least partially solve the above problem.

According to an aspect of the present disclosure, a method for displaying handwritten input content is provided, which includes: acquiring handwritten input content; modifying image stored in a display cache based on the handwritten input content, and synchronizing a modified image to a display screen; and drawing the handwritten input content in a custom graphic layer located above other graphic layers in a system cache, performing a graphic layer merging operation for the other graphic layers and the custom graphic layer, and replacing the modified image stored in the display cache in response to a result of the operation.

According to another aspect of the present disclosure, an electronic device is provided. The electronic device includes at least one processor; and at least one memory, the at least one memory storing executable instructions that upon execution cause the at least one processor to perform operations, the operations comprising: acquiring handwritten input content; modifying image stored in a display cache based on the handwritten input content, and synchronizing a modified image to a display screen; and drawing the handwritten input content in a custom graphic layer located above other graphic layers in a system cache, performing a graphic layer merging operation for the other graphic layers and the custom graphic layer, and replacing the modified image stored in the display cache in response to a result of the operation.

According to another aspect of the present disclosure, a non-volatile computer readable storage medium storing executable instructions is provided. The executable instructions cause the processor to: acquire handwritten input content; modify image stored in a display cache based on the handwritten input content, and synchronize a modified image to a display screen; and draw the handwritten input content in a custom graphic layer located above other graphic layers in a system cache, perform a graphic layer merging operation for the other graphic layers and the custom graphic layer, and replace the modified image stored in the display cache in response to a result of the operation.

According to another aspect of the present disclosure, a computer program product is further provided. The computer program product includes computer programs stored in the above non-volatile computer readable storage medium.

According to the method for displaying handwritten input content, the electronic device, the non-volatile computer readable storage medium and the computer program product according to the present disclosure, once the handwritten input content is acquired, the following operations are performed. In one aspect, image stored in the display cache is modified based on the handwritten input content, and a modified image is synchronized to a display screen. In another aspect, the handwritten input content is drawn in the custom graphic layer located above other graphic layers in the system cache, and a graphic layer merging operation is performed for the other layers and the custom layer and the modified image stored in the display cache is replaced in response to a result of the operation. It follows that, the handwritten input content is directly drawn on the image stored in the display cache, and it is unnecessary for the system cache to perform picture merging and copy, thereby greatly improving display speed. In addition, since the handwritten content is drawn in the image stored in the display cache, and the content displayed in the system cannot be covered. Further, the handwritten input content is drawn in the custom graphic layer located above the other graphic layers, so a result of a merging operation includes the handwritten input content when the system perform the merging operation, thereby ensuring that the handwritten input content cannot be covered due to a refreshing behavior of the system.

The summary of the technical solutions of the present disclosure is described above. The technical means of the present disclosure may be understood clearer according to content of the specification. In order to make the above and other objects, features and advantages of the present disclosure clearer and easier to be understood, specific embodiments of the present disclosure are described hereinafter.

BRIEF DESCRIPTION OF THE DRAWINGS

According to the detailed description of preferred embodiments of the present disclosure, various other advantages and benefits become clear for those skilled in the art. Drawings are only used to illustrate the preferred embodiments rather than limit the present disclosure. Throughout the drawings, the same components are represented by the same reference numeral. In the drawings.

DETAILED DESCRIPTION

Hereinafter, exemplary embodiments of the present disclosure will be described in more detail with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure, and to fully convey the scope of the present disclosure to those skilled in the art.

First Embodiment

Figure 1:
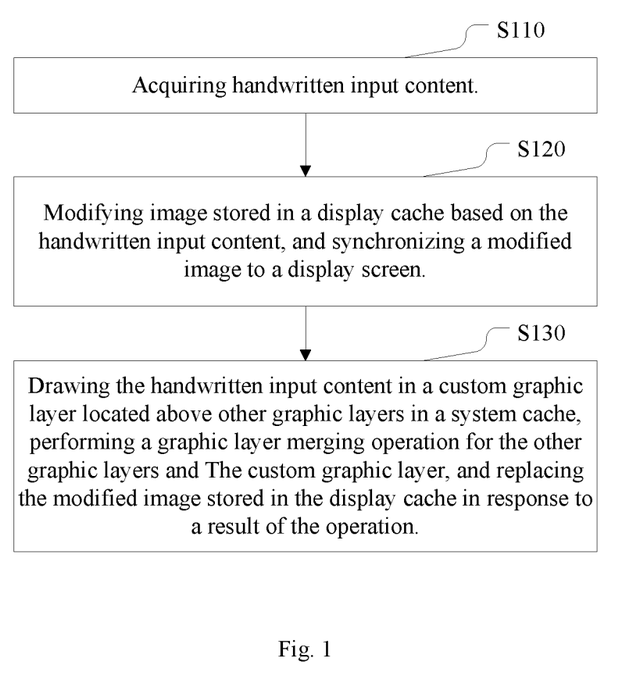
FIG. 1 is a flowchart of a method for displaying handwritten input content according to an embodiment of the present disclosure.

FIG. 1 shows a flowchart of a method for displaying handwritten input content according to an embodiment of the present disclosure. As shown in FIG. 1, the method includes the steps as follows.

In step S110, handwritten input content is acquired.

Step S110 is performed whenever the handwritten input content is received.

Specifically, the specific definition of the handwritten input content may be flexibly defined by those skilled in the art. For example, content input via various applications or in various handwritten input manners may be acquired as the handwritten input content. Alternatively, content input via a preset application such as an electronic book may be acquired as the handwritten input content, depending on actual business requirements. For example, an application of which a handwritten input speed is required to be improved may be determined as a preset application in advance, and operations in subsequent steps are performed on only content input via the preset application.

In step S120, image stored in a display cache is modified based on the handwritten input content, and a modified image is synchronized to a display screen.

The display cache is configured to make the modified image is synchronized to a display screen. The display cache may be a video memory or a frame buffer. Therefore, display content in the display screen synchronizes with the image stored in the display cache. Whenever the image in the display cache is updated, the display content in the display screen is updated accordingly.

Accordingly, in this step, first, the image stored in the display cache is acquired. The image may be obtained by performing a graphic layer merging operation for a plurality of graphic layers. Then, the stored image is modified based on the handwritten input content, so that the handwritten input content is drawn in the display cache, thereby making the display screen display synchronically. A display speed of the handwritten input content can be improved through this step.

In step S130, the handwritten input content is drawn in a custom graphic layer located above other graphic layers in the system cache, a graphic layer merging operation is operated for the other graphic layers and the custom graphic layer, and the modified image stored in the display cache is replaced in response to a result of the operation.

The system cache may be various forms of cache area, as long as the graphic layers can be cached. The system cache is configured to store the graphic layers and perform a graphic layer merging operation on the graphic layers on receipt of a merging instruction to obtain new image, so that the display cache replaces the previously stored image with the new image, thereby refreshing the screen. Specifically, the graphic layers may correspond to different user applications, or may correspond to system applications in an operating system. Therefore, a merging instruction is triggered whenever the user application or the system application needs to refresh a display of the display screen, so that the respective graphic layers in the system cache are merged and then provided to the display cache for displaying.

It is found by the inventor during implementing the present disclosure that, the display speed can be improved by the manner described in step S120. However, after the system cache receives the merging instruction, the image stored in the display cache will be covered by a merging result output by the system cache, resulting in that the handwritten input content disappears. In order to solve the above problem, a custom graphic layer located above the other graphic layers is created according to the present disclosure, and the handwritten input content is drawn on the custom graphic layer. Since the custom graphic layer is located above the other graphic layers in the system cache, content in the custom graphic layer cannot be covered. After the system cache receives the merging instruction, content in the custom graphic layer participates in merging. Therefore, the handwritten input content in the custom graphic layer cannot be covered by a merging result, thereby efficiently solving the problem that the handwritten input content disappears as the system cache performs the merging operation. In a specific implementation, the custom graphic layer may be a transparent graphic layer or a translucent graphic layer.

An order for performing steps S120 and S130 is not limited. Steps S120 and S130 may be performed simultaneously or may be performed successively.

It follows that, according to the method, the handwritten input content is drawn on the image stored in the display cache, and it is unnecessary for the system cache to perform the picture merging and copy operation, thereby greatly improving the display speed. In addition, since the handwritten input content is drawn on the image stored in the display cache, the existing display content in the system is not covered. Further, the handwritten input content is drawn in the custom graphic layer located above other graphic layers. Therefore, when the system performs a merging operation, a result of the merging operation still includes the handwritten input content, thereby ensuring that the handwritten input content cannot be covered due to a refreshing behavior of the system.

Second Embodiment

Figure 2:
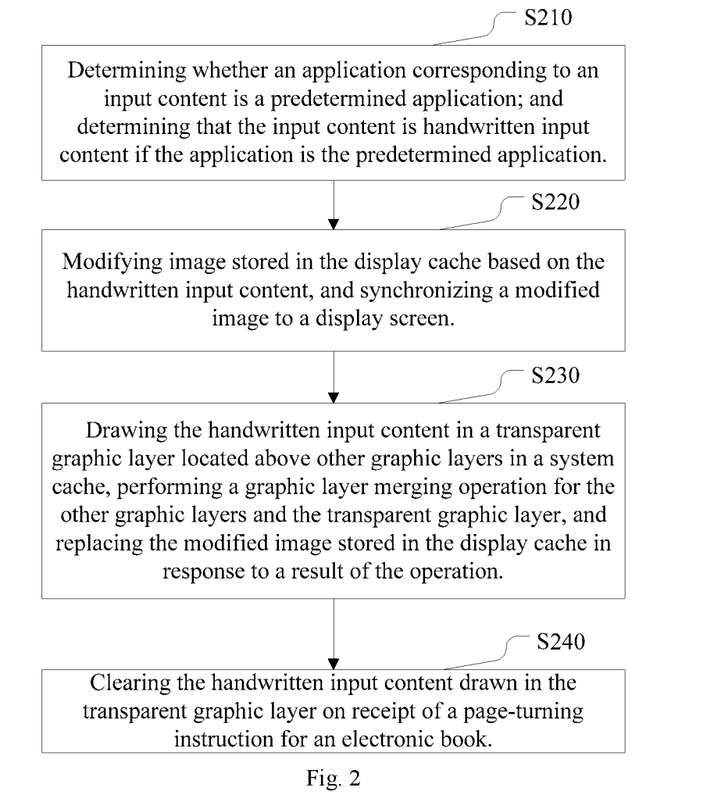
FIG. 2 is a flowchart of a method for displaying handwritten input content according to another embodiment of the present disclosure.

FIG. 2 shows a flowchart of a method for displaying handwritten input content according to another embodiment of the present disclosure. As shown in FIG. 2, the method includes steps as follows.

In step S210, it is determined whether an application corresponding to an input content is a predetermined application; and it is determined that the input content is handwritten input content if the application is the predetermined application.

In the embodiment, an application for which a handwritten input speed is required to be improved is determined as a predetermined application in advance, and operations in subsequent steps are performed only for the content input by the predetermined application. In the embodiment, the predetermined application mainly refers to an electronic book application.

This step may be implemented through at least one of two manners as follows. In a first manner, an application identification of the input content is acquired, and it is determined whether the application corresponding to the input content is the predetermined application based on the application identification; and it is determined that the input content is the handwritten input content if it is determined that the application is the predetermined application. Specifically, the user needs to input the content through a corresponding application. For example, the user may input the content through an input interface arranged in an electronic book application. Accordingly, the input content carries the application identification of the electronic book, indicating that the content is input by the electronic book application. Therefore, it can be determined whether the application corresponding to the input content is the predetermined application by acquiring the application identification of input content, and subsequent steps are performed in a case that it is determined that the application is the predetermined application, thereby improving the input speed of the electronic book. In a second manner, it is detected whether an application running in a foreground is the predetermined application on receipt of the input content, and it is determined that the input content is the handwritten input content if the application running in a foreground is the predetermined application. For example, if the application running in a foreground is the electronic book application on receipt of the input content, subsequent steps are performed, thereby improving the input speed of the electronic book.

In step S220, image stored in the display cache is modified based on the handwritten input content, and a modified image is synchronized to a display screen.

The display cache is configured to make the modified image is synchronized to a display screen. The display cache may be a video memory or a frame buffer. The image is cached in the display cache. Therefore, the image may also be referred to as "image cache". As the name suggests, the "image cache" is only temporarily stored in the display cache, and the "image cache" is refreshed once the display cache receives a latest merging result provided by the system cache. In the embodiment, the display cache is a frame buffer. Therefore, the display content in the display screen synchronizes with the image stored in the display cache. Whenever the image in the display cache is updated, the display content in the display screen is updated accordingly.

In this step, the image stored in the display cache is acquired, and the handwritten input content is drawn in the image, to obtain the modified image. The image stored in the display cache is obtained by a result of the merging operation previously performed by the system cache described in step S230 (that is, image obtained by a result of a latest merging operation by the system cache), and the handwritten input content acquired in step S210 is drawn in the image stored in the display cache, so that the handwritten input content is added into the display cache in a real time, without drawing the handwritten input content in the system cache. For the time consumed during the merging operation performed on the graphic layers in the system cache, delay due to copying from the system cache to the display cache is avoided, thereby greatly improving the display speed and realizing real-time displaying.

In addition, the display screen displays the modified image synchronically based on a default synchronization manner of the system. For example, in a synchronization manner, the modified image is synchronized to a display screen in response to a synchronization instruction. Accordingly, a system intermediate layer is responsible for performing an operation of synchronization. The system intermediate layer sends a synchronization instruction to the display cache once every preset time interval, so that image currently stored in the display cache is transmitted to the display screen. For another example, in another synchronization manner, the modified image is synchronized to a display screen in real time, thereby ensuring real-time synchronization between the display screen and the display cache. Those skilled in the art may choose an appropriate synchronization manner as needed.

In step 230, the handwritten input content is drawn in a transparent graphic layer located above other graphic layers in the system cache, a graphic layer merging operation is operated for the other graphic layers and the transparent graphic layer, and the modified image stored in the display cache is replaced in response to a result of the operation.

In the embodiment, the system cache may be a background buffer or may be other cache area. The system cache is configured to store the graphic layers corresponding to applications. In response to a drawing request triggered by an application is received, the system allocates a canvas for the application in the system cache. A graphic layer for implementing the canvas is a the graphic layer corresponding to the application. When there are a plurality of applications performing drawing in parallel in the system, there are a plurality of graphic layers in the system cache. On receipt of a merging instruction, the system cache performs merging operation on the stored graphic layers, to obtain new image, so that the display cache replaces the previously stored image with the new image, thereby refreshing a picture on the display screen.

The graphic layers may correspond to different user applications, or may correspond to a system application of an operating system. For example, when a user initiates a drawing operation through an application for beautifying a picture, a graphic layer corresponding to the application for beautifying a picture is generated in the system cache, for drawing content input through the application of beauty map. For example, when the system detects that the power is excessively low, a graphic layer corresponding to the system power is generated in the system cache, for drawing power reminder. It follows that, the system cache is configured to simultaneously store the graphic layers corresponding to various applications, and perform a merging operation on all graphic layers stored in the system cache on receipt of a merging instruction triggered by an application, and transmits a result of the merging operation to the display cache, so that the display content in the display screen is updated by the display cache. Specifically, a merging instruction is triggered whenever a user application or a system application needs to refresh a display picture of the display screen, so that the respective graphic layers in the system cache are merged and then provided to the display cache for displaying. For example, a merging instruction is triggered after the system application completes drawing of the power reminder, to cause the display screen to pop up a dialogue box for reminding low power.

In this step, the other graphic layers stored in the system cache are determined, and the transparent graphic layer (also referred to as the custom graphic layer) on top of the other graphic layers is created. The handwritten input content acquired in step S210 is drawn in the transparent graphic layer. A set-top operation may be performed for the transparent graphic layer, so that the transparent graphic layer is never covered by other graphic layers.

When the system cache performs a merging operation on the other graphic layers and the custom graphic layer stored in the system cache based on the received merging instruction, the image stored in the display cache is replaced in response to a result of the operation. There are a plurality of types of merging instructions, the plurality of types of merging instructions comprise at least one of: a first type of merging instruction triggered by an operating system or a second type of merging instruction triggered by an application. The first type of merging instruction triggered by the operating system includes a merging instruction related to a system behavior, such as a merging instruction for displaying power reminder which is triggered when it is detected that the power is lower than a preset threshold. The second type of merging instruction triggered by the application includes a merging instruction related to an application behavior, such as a merging instruction for displaying content corresponding to a certain application which is triggered when the application completes drawing of the content corresponding to the application.

It follows that, in the embodiment, when the user inputs handwritten input content through the electronic book application, the user directly draws the handwritten input content in the display cache, to improve the display speed. In addition, in order to avoid losing the handwritten input content in the display cache when other application refreshes a picture (i.e., triggering a merging instruction), the handwritten input content is stored by the transparent graphic layer located above the other graphic layers in the system cache, so that the handwritten input content is still stored in a refreshed picture after other application refreshes a picture. In addition, the handwritten input content is drawn in the transparent graphic layer in the present disclosure plays a role to prevent losing the handwritten input content due to graphic layers merging performed by other applications, and the handwritten input content is drawn in the display cache. Therefore, according to the present disclosure it is unnecessary for the electronic book application to send a merging instruction to the system cache, thereby further reducing the operation complexity and improving the display efficiency.

In addition, the transparent graphic layer as described above may cover over the other graphic layers and has the same size as a graphic layer whose size is maximum among all the other graphic layers, to ensure that the user can perform handwritten input in any area in the display screen. Alternatively, the transparent graphic layer may cover only a part area of each of the other graphic layer, so that the user can perform handwritten input by the corresponding part area. In a specific implementation, the transparent graphic layer may be set based on a position and a size of a handwritten area included in the display screen.

In step S240, the handwritten input content drawn in the transparent graphic layer is cleared on receipt of a page-turning instruction for the electronic book.

A specific application context for the embodiment is that: during a process of reading an electronic book, the user performs an annotation operation and the like on a current page displayed in the electronic book by handwritten input; the user expects that the handwritten input content is displayed only in the current page; and after the user performs a page-turning operation, the annotation on the page is not displayed on a next page. Therefore, in the embodiment, a transparent graphic layer common for various pages is created during running of the electronic book, and whenever a page-turning instruction is received, content drawn in the transparent graphic layer is deleted, to prevent displaying the annotation written in a page by the user in a next page. In addition, in order to facilitate a reader to read the handwritten annotation later, in the embodiment, the handwritten input content may be stored in association with the a corresponding page, to facilitate the user to look for the handwritten content recorded in the page later. Further, a user identification corresponding to the handwritten input content may be stored in association with the handwritten input content, so that corresponding handwritten content is displayed for different users.

In addition, those skilled in the art may make changes and variations on the above embodiments. For example, in a variation embodiment, a corresponding transparent graphic layer is created for each electronic book page. Accordingly, an operation of creating a transparent graphic layer on top of other graphic layers may be triggered after step S210 or step S220, or may be triggered whenever a page-turning instruction for the electronic book is received. For example, the operation of creating the transparent graphic layer may be triggered in response to a page-turning instruction from the user. That is, when the user turns to a current page of the electronic book through the page-turning instruction, a corresponding transparent graphic layer is created for the current page, to store handwritten input content corresponding to the current page. Thus, whenever the user turns to a new page, an initial state of the corresponding transparent graphic layer is empty, thereby preventing displaying the handwritten input content corresponding to the previous page in the current page. If the user performs a handwritten input to the current page, the handwritten input content is displayed on the current page via a corresponding transparent graphic layer.

In addition, those skilled in the art may combine the above steps into fewer steps, or may divide the above steps into more steps. The above step S220 and step S230 may be performed simultaneously or may be performed in an order, which is not limited in the present disclosure. By the way described above, both the pages in the electronic book and the pages in APP can be displayed. Since the refresh speed of an ink screen is slower, the method according to the present disclosure is particularly suitable to an electronic book reader implemented by the ink screen.

Optionally, in order to further improve the display speed, the number of the display caches in the embodiment may be at least two. The respective display caches alternately perform data synchronization with the display screen, thereby improving display efficiency through a multi-caching mechanism. Specifically, if the system cache copies a merging result to a first display cache this time so that the display screen displays synchronically via the first display cache, the system cache copies a merging result to the second display cache next time, so that the display screen displays synchronically via the second display cache. Based on the multi-caching mechanism, a cache identification of a display cache which is currently being used needs to be identified in the present disclosure. Accordingly, the modifying image stored in the display cache based on the handwritten input content further includes: modifying image stored in the display cache which is currently being used based on the handwritten input content.

In summary, according to the method of the present disclosure, the handwritten input content is directly drawn in the image stored in the display cache, and it is unnecessary to perform picture merging and copying operation by the system cache, thereby greatly improving the display speed. Since the handwritten input content is drawn in the image stored in the display cache, the existing display content in the system is not covered. In addition, since the handwritten input content is drawn in the custom graphic layer located above the other graphic layers, a result of the merging operation still includes the handwritten input content when the system performs the merging operation, thereby ensuring that the handwritten input content is not covered due to a refreshing behavior of the system. Further, the handwritten input content is drawn in the custom graphic layer in the system cache, so as to prevent that the handwritten input content drawn in the display cache disappears after other application triggers a merging operation. Therefore, in the present disclosure, it is unnecessary for the electronic book application itself to actively trigger the merging operation (also referred to as a picture refreshing operation), thereby simplifying the operation process and improving the operation efficiency. In addition, the handwritten content on the previous page may be cleared in response to the page-turning operation from the user, thereby improving reading experience of the user when using the electronic book.

Finally, it is found by the inventor by experiments that, compared with the conventional technology, delay of 30 ms can be reduced at least according to the above solution. In a case that there are more graphic layers to be merged, even delay of 50 ms can be reduced, thereby providing better experience for the user during the reading process.

Third Embodiment

A non-volatile computer readable storage medium is provided according to an embodiment of the present disclosure. The non-volatile computer readable storage medium stores executable instructions, which may perform the method for displaying handwritten input content according to any method embodiment described above.

The executable instructions cause a processor to perform operations of:
acquiring handwritten input content;
modifying image stored in a display cache based on the handwritten input content, and synchronizing a modified image to a display screen; and
drawing the handwritten input content in a custom graphic layer located above other graphic layers in a system cache, performing a graphic layer merging operation for the other graphic layers and the custom graphic layer, and replacing the modified image stored in the display cache in response to a result of the operation.

In an optional embodiment, the operations further comprise:
acquiring the image stored in the display cache and drawing the handwritten input content in the image, to obtain the modified image.

In an optional embodiment, the synchronizing a display on a display screen with modified image includes:
in response to a synchronization instruction, synchronizing the modified image to the display screen; or
synchronizing the modified image to the display screen in real time.

In an optional embodiment, the operations further comprise:
determining the other graphic layers stored in the system cache, creating the custom graphic layer on top of the other graphic layers, and drawing the handwritten input content in the custom graphic layer.

In an optional embodiment, the custom graphic layer is a transparent graphic layer.

In an optional embodiment, the operations further comprise:
in response to a merging instruction, performing a graphic layer merging operation for the other graphic layers and the custom graphic layer, and replacing the modified image stored in the display cache in response to a result of the operation, wherein there are a plurality of types of merging instructions, the plurality of types of merging instructions comprise at least one of: a first type of merging instruction triggered by an operating system or a second type of merging instruction triggered by an application.

In an optional embodiment, the operations further comprise:
determining whether an application corresponding to an input content is a predetermined application, and determining that the input content is handwritten input content if the application is the predetermined application.

In an optional embodiment, the operations further comprise:
acquiring an application identification of the input content, and determining whether the application corresponding to the input content is the predetermined application based on the application identification; or detecting whether an application running in a foreground is the predetermined application on receipt of the input content, and determining that the input content is handwritten input content if the application running in a foreground is the predetermined application; wherein the predetermined application comprises an electronic book application.

In an optional embodiment, the operations further comprise:

clearing the handwritten input content drawn in the custom graphic layer on receipt of a page-turning instruction for an electronic book.

In an optional embodiment, the display cache is a frame buffer, and the system cache is background buffer. In addition, the operations are used to display a page in an electronic book or the operations are used to display a page in an APP.

Fourth Embodiment

Figure 3:
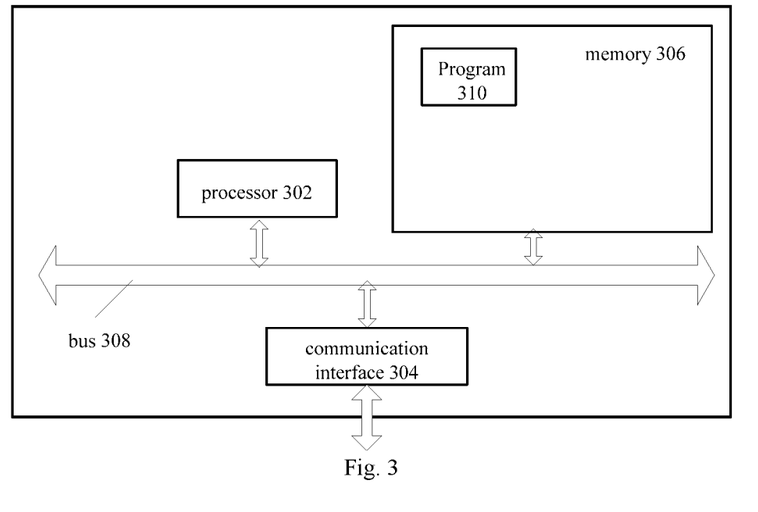
FIG. 3 is a schematic structural diagram of an electronic device according to another embodiment of the present disclosure.

FIG. 3 is a schematic structural diagram of an electronic device according to another embodiment of the present disclosure. Implementations of the electronic device are not limited in embodiments of the present disclosure.

As shown in FIG. 3, the electronic device may include: a processor 302, a communications interface 304, a memory 306 and a communication bus 308.

The processor 302, the communication interface 304 and the memory 306 communicate with each other through the communication bus 308. The communication interface 304 is configured to perform network element communication with other device such as a client or other server. The processor 302 is configured to perform programs 310, to perform related steps in the embodiments of the method for displaying handwritten input content described above.

The program 310 may include program codes which include computer operation instructions.

The processor 302 may be a central processing unit CPU, an application specific integrated circuit (ASIC), or one or more integrated circuits configured to implement the embodiment of the present disclosure. The one or more processors included in the electronic device may be processors of the same type, such as one or more CPU; or may be processors of different types, such as one or more CPU or one or more ASIC.

The memory 306 is configured to store programs 310. The memory 306 may include a high speed RAM, or may include a non-volatile memory, such as at least one magnetic disk memory.

The programs 310 may cause the processor 302 to perform operations of:

acquiring handwritten input content;

modifying image stored in a display cache based on the handwritten input content, and synchronizing a modified image to a display screen; and drawing the handwritten input content in a custom graphic layer located above other graphic layers in a system cache, performing a graphic layer merging operation for the other graphic layers and the custom graphic layer, and replacing the modified image stored in the display cache in response to a result of the operation.

In an optional embodiment, the programs 310 cause the processor to perform operations of:

acquiring the image stored in the display cache and drawing the handwritten input content in the image, to obtain the modified image.

In an optional embodiment, the transmitting, by the display cache, the synchronizing a display on a display screen with modified image includes:

in response to a synchronization instruction, synchronizing the modified image to the display screen; or synchronizing the modified image to the display screen in real time.

In an optional embodiment, the programs 310 cause the processor to perform operations of:

determining the other graphic layers stored in the system cache, creating the custom graphic layer on top of the other graphic layers, and drawing the handwritten input content in the custom graphic layer.

In an optional embodiment, the custom graphic layer is a transparent graphic layer.

In an optional embodiment, the programs 310 cause the processor to perform operations of:

in response to a merging instruction, performing a graphic layer merging operation for the other graphic layers and the custom graphic layer, and replacing the modified image stored in the display cache in response to a result of the operation, wherein there are a plurality of types of merging instructions, the plurality of types of merging instructions comprise at least one of: a first type of merging instruction triggered by an operating system or a second type of merging instruction triggered by an application.

In an optional embodiment, the programs 310 cause the processor to perform operations of: determining whether an application corresponding to an input content is a predetermined application, and determining that the input content is handwritten input content if the application is the predetermined application.

In an optional embodiment, the programs 310 cause the processor to perform operations of:

acquiring an application identification of the input content, and determining whether the application corresponding to the input content is the predetermined application based on the application identification; or detecting whether an application running in a foreground is the predetermined application on receipt of the input content, and determining that the input content is handwritten input content if the application running in a foreground is the predetermined application; wherein the predetermined application comprises an electronic book application.

The predetermined application includes an electronic book application.

In an optional embodiment, the programs 310 cause the processor to perform an operation of:

clearing the handwritten input content drawn in the custom graphic layer on receipt of a page-turning instruction for an electronic book.

In an optional embodiment, the display cache is a frame buffer and the system cache is a background buffer. The operations are used to display a page in an electronic book or the operations are used to display a page in an APP.

The algorithm and display described herein is not inherently related to a certain computer, virtual system or other device. Various general systems may be used together based on the teaching herein. According to the above description, structures for constructing the system are obvious. In addition, the present disclosure is not for any certain programming language. It should be understood that, the present disclosure may be implemented by various programming languages, and the above specific description is used to disclose the optimal embodiments of the present disclosure.

A large number of details are illustrated here in the specification. However, it should be understood that the embodiments of the present disclosure may be implemented without these details. In some examples, well-known methods, structures and technology are not illustrated in detail, so as not to obscure understanding of the present disclosure.

Similarly, it should be understood that, for simplifying the present disclosure and assisting understanding one or more of aspects of the present disclosure, features of the present disclosure are provided in a single embodiment, drawing or description thereof, in the description of the schematic embodiments of the present disclosure above. However, the method according to the present disclosure should not be interpreted as follows: the claimed disclosure has more features than those recited definitely in each claim. More definitely, as shown by the claims attached below, each claim recites less features than those disclosed in a single embodiment. Therefore, a claim corresponding to a certain embodiment is definitely incorporated into the embodiment, and each claim functions as a single embodiment of the present disclosure.

Those skilled in the art should understand that modules in the device of the embodiment may be changed adaptively and may be arranged in one or more devices, different from the embodiment herein. The modules, units or components in the embodiment may be combined into one module, unit or component, and the module, unit or component may be divided into a plurality of sub-modules, subunits or sub-components. Unless the features or processes or units conflict with each other, all features disclosed in the specification (including the accompanying claims, abstract and drawings) and all processes or units in the method or device in the present disclosure may be combined in any manner. Unless definitely illustrated, each feature disclosed in the specification (including the accompanying claims, abstract and drawings) may be replaced with alternative features which may achieve the same, equivalent or similar object.

In addition, those skilled in the art should understand that although some embodiments described here include certain features rather than all features included in other embodiments, different embodiments can be formed by combining of features of different embodiments within the scope of the present disclosure. For example, in the following claims, the claimed embodiments may be used by combining in any manner.

It should be understood that the above embodiments are used to illustrate the present disclosure rather than limiting the present disclosure, and alternative embodiments may be designed by those skilled in the art without departing from the scope of the attached claims. In the claims, any reference symbol in the parentheses should not be constructed as limiting the claims. The term "comprising" does not preclude elements or steps not listed in the claims. Element defined by "a" or "an" does not preclude that there are a plurality of elements. The present disclosure may be implemented by hardware including several different elements and appropriate programming by means of a computer. In a unit claim including a plurality of devices, the a plurality of devices may be implemented by the same hardware. Terms of first, second and third and so on do not represent any order. The terms may be explained as names.

What is claimed is:

1. A method for displaying handwritten input content, comprising:
  acquiring handwritten input content;
  modifying an image stored in a display cache based on the handwritten input content, and synchronizing a modified image to a display screen, wherein the image stored in the display cache is obtained by a previous merging result from a system cache, wherein the display cache is a frame buffer for temporarily storing image data and synchronizing the image data with the display screen, wherein the image data temporarily stored in the display cache is refreshed once the display cache receives a latest merging result from the system cache, and wherein the modifying an image stored in a display cache based on the handwritten input content comprises directly drawing the handwritten input content in the display cache;
  generating a custom graphic layer located above other graphic layers in the system cache, drawing the handwritten input content in the custom graphic layer, wherein the system cache is configured to store the custom graphic layer and the other graphic layers corresponding to various applications, and the system cache is different from the display cache;
  performing a graphic layer merging operation for the other graphic layers and the custom graphic layer in response to receiving a merging instruction triggered by an application among the various applications;
  transmitting a result of the merging operation to the display cache, wherein the result of the merging operation prevents the handwritten input content from disappearing after a refreshing operation; and
  replacing the modified image in the display cache using the result of the merging operation.

2. The method according to claim 1, wherein the modifying image stored in a display cache based on the handwritten input content comprises:
  acquiring the image stored in the display cache and drawing the handwritten input content in the image, to obtain the modified image.

3. The method according to claim 1, wherein the synchronizing a modified image to a display screen comprises:
  in response to a synchronization instruction, synchronizing the modified image to the display screen; or
  synchronizing the modified image to the display screen in real time.

4. The method according to claim 1, wherein the drawing the handwritten input content in a custom graphic layer located above other graphic layers in a system cache comprises:
  determining the other graphic layers stored in the system cache, creating the custom graphic layer on top of the other graphic layers, and
  drawing the handwritten input content in the custom graphic layer, wherein the custom graphic layer is a transparent graphic layer.

5. The method according to claim 1, wherein the performing a graphic layer merging operation for the other graphic layers and the custom graphic layer, and replacing the modified image stored in the display cache in response to a result of the operation comprises:
  in response to a merging instruction, performing a graphic layer merging operation for the other graphic layers and the custom graphic layer, and replacing the modified image stored in the display cache in response to a result of the operation,
  wherein there are a plurality of types of merging instructions, the plurality of types of merging instructions comprise at least one of: a first type of merging instruction triggered by an operating system or a second type of merging instruction triggered by an application.

6. The method according to claim 1, wherein the acquiring handwritten input content comprises:
  determining whether an application corresponding to an input content is a predetermined application, and
  determining that the input content is handwritten input content if the application is the predetermined application.

7. The method according to claim 6, wherein the determining whether an application corresponding to an input content is a predetermined application comprises:
  acquiring an application identification of the input content, and determining whether the application corresponding to the input content is the predetermined application based on the application identification; or
  detecting whether an application running in a foreground is the predetermined application on receipt of the input content, and determining that the input content is handwritten input content if the application running in a foreground is the predetermined application;
  wherein the predetermined application comprises an electronic book application.

8. The method according to claim 1, wherein after the drawing the handwritten input content in a custom graphic layer located above other graphic layers in a system cache, the method further comprises:
  clearing the handwritten input content drawn in the custom graphic layer on receipt of a page-turning instruction for an electronic book.

9. The method according to claim 1, wherein the system cache is a background buffer; and
  the method is used to display a page in an electronic book or the method is used to display a page in an application.

10. An electronic device, comprising:
  at least one processor; and
  at least one memory, the at least one memory storing executable instructions that upon execution cause the at least one processor to perform operations, the operations comprising:
  acquiring handwritten input content;
  modifying an image stored in a display cache based on the handwritten input content, and synchronizing a modified image to a display screen, wherein the image stored in the display cache is obtained by a previous merging result from a system cache, wherein the display cache is a frame buffer for temporarily storing image data and synchronizing the image data with the display screen, wherein the image data temporarily stored in the display cache is refreshed once the display cache receives a latest merging result from the system cache, and wherein the modifying an image stored in a display cache based on the handwritten input content comprises directly drawing the handwritten input content in the display cache;
  generating a custom graphic layer located above other graphic layers in a system cache drawing the handwritten input content in the custom graphic layer, wherein the system cache is configured to store the custom graphic layer and the other graphic layers corresponding to various applications, and the system cache is different from the display cache;
  performing a graphic layer merging operation for the other graphic layers and the custom graphic layer in response to receiving a merging instruction triggered by an application among the various applications;
  transmitting a result of the merging operation to the display cache, wherein the result of the merging operation prevents the handwritten input content from disappearing after a refreshing operation; and
  replacing the modified image in the display cache using the result of the merging operation.

11. The electronic device according to claim 10, wherein the operations further comprise:
  acquiring the image stored in the display cache and drawing the handwritten input content in the image, to obtain the modified image.

12. The electronic device according to claim 10, wherein the operations further comprise:
  in response to a synchronization instruction, synchronizing the modified image to the display screen; or
  synchronizing the modified image to the display screen in real time.

13. The electronic device according to claim 10, wherein the operations further comprise:
  determining the other graphic layers stored in the system cache, creating the custom graphic layer on top of the other graphic layers, and
  drawing the handwritten input content in the custom graphic layer, wherein the custom graphic layer is a transparent graphic layer.

14. The electronic device according to claim 10, wherein the operations further comprise:
  in response to a merging instruction, performing a graphic layer merging operation for the other graphic layers and the custom graphic layer, and replacing the modified image stored in the display cache in response to a result of the operation,
  wherein there are a plurality of types of merging instructions, the plurality of types of merging instructions comprise at least one of: a first type of merging instruction triggered by an operating system or a second type of merging instruction triggered by an application.

15. The electronic device according to claim 10, wherein the operations further comprise:
  determining whether an application corresponding to an input content is a predetermined application, and
  determining that the input content is handwritten input content if the application is the predetermined application.

16. The electronic device according to claim 15, wherein the operations further comprise:
  acquiring an application identification of the input content, and determining whether the application corresponding to the input content is the predetermined application based on the application identification; or
  detecting whether an application running in a foreground is the predetermined application on receipt of the input content, and determining that the input content is handwritten input content if the application running in a foreground is the predetermined application;
  wherein the predetermined application comprises an electronic book application.

17. The electronic device according to claim 10, wherein the operations further comprise:
  clearing the handwritten input content drawn in the custom graphic layer on receipt of a page-turning instruction for an electronic book.

18. The electronic device according to claim 10, wherein the system cache is a background buffer; and the operations are used to display a page in an electronic book or the operations are used to display a page in an application.

19. A non-volatile computer readable storage medium storing executable instructions that cause a processor to:
  acquire handwritten input content;
  modify an image stored in a display cache based on the handwritten input content, and synchronize a modified image to a display screen, wherein the image stored in the display cache is obtained by a previous merging result from a system cache, wherein the display cache is a frame buffer for temporarily storing image data and synchronizing the image data with the display screen, wherein the image data temporarily stored in the display cache is refreshed once the display cache receives a latest merging result from the system cache, and wherein the modifying an image stored in a display cache based on the handwritten input content comprises directly drawing the handwritten input content in the display cache;

generate a custom graphic layer located above other graphic layers in a system cache, draw the handwritten input content in the custom graphic layer, wherein the system cache is configured to store the custom graphic layer and the other graphic layers corresponding to various applications, and the system cache is different from the display cache;

perform a graphic layer merging operation for the other graphic layers and the custom graphic layer in response to receiving a merging instruction triggered by an application among the various applications;

transmitting a result of the merging operation to the display cache, wherein the result of the merging operation prevents the handwritten input content from disappearing after a refreshing operation; and replace the modified image in the display cache using the result of the merging operation.

\* \* \* \* \*